United States Patent Office 3,318,901
Patented May 9, 1967

3,318,901
N - DIALKYLAMINOALKYL-1-XANTHENYLPIPER-IDINECARBOXAMIDES AND RELATED COMPOUNDS
John W. Cusic, Skokie, and Peter Yonan, Chicago, Ill., assignors to G. D. Searle & Co., Chicago, Ill., a corporation of Delaware
No Drawing. Filed Feb. 7, 1966, Ser. No. 525,353
6 Claims. (Cl. 260—294)

The present application is a continuation-in-part of application Ser. No. 405,616, filed Oct. 21, 1964, now U.S. Patent 3,262,934 issued July 26, 1966.

The present invention relates to a group of complex organic compounds which are piperidinecarboxamides having substituents on both the amine and the amide nitrogens. More particularly, the present invention relates to a group of compounds having the following general formula

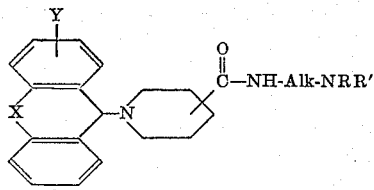

wherein X is selected from the group consisting of O and S; Y is selected from the group consisting of hydrogen and halogen; Alk is lower alkylene separating the nitrogens attached thereto by at least 2 carbon atoms; and —NRR' is selected from the group consisting of di(lower alkyl)amino, 1-pyrrolidinyl, piperidino, morpholino, 4-methyl-1-piperazinyl, and azabicycloalkyl containing 7 to 9 carbon atoms.

The halogen atoms referred to above include fluorine, chlorine, bromine, and iodine although chlorine is preferred. The lower alkylene radicals referred to above contain up to 6 carbon atoms and separate the nitrogens attached thereto by at least 2 carbon atoms; examples of such radicals are ethylene, propylene, and trimethylene. The lower alkyl radicals referred to in the formula above also have an upper limit of 6 carbon atoms and they are exemplified by radicals such as methyl, ethyl, propyl, isopropyl, and butyl. The azabicycloalkyl radicals referred to above contain from 7 to 9 carbon atoms in addition to the nitrogen atom through which it is attached to the remainder of the molecule. Each ring therein contains at least 5 atoms. Some examples of radicals of this type are 3-azabicyclo[3.2.2]non-3-yl, 7-azabicyclo[4.3.0]non-7-yl, and 3-azabicyclo[4.4.0]dec-3-yl, and 3-azabicyclo[3.3.0]oct-3-yl.

The organic bases of this invention form non-toxic addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, asorbic, and related acids.

The compounds of the present invention are useful because of their pharmacological properties. Thus, the compounds possess anti-ulcer activity; this is demonstrated by a decrease in acid and protease secretion and inhibition of ulcer formation in the Shay rat. The compounds are also hypocholesterolemic agents; they inhibit hepatic synthesis of cholesterol and reduce serum triglycerides. Furthermore, the present compounds possess anti-biotic activity against a variety of organisms. Thus, they inhibit the growth of protozoa such as *Tetrahymena gelleii*, fungi such as *Candida albicans*, and algae such as *Chlorella vulgaris*.

The compounds of the present invention are conveniently prepared by the reaction of a xanthydrol or thioxanthydrol with the appropriate piperidine-carboxamide. The reaction is carried out at reflux in an inert solvent in the presence of a weak acid. Toluene is a particularly useful solvent for the reaction although benzene and xylene are examples of other solvents which can be used for this purpose. A weak acid such as acetic acid can be used to catalyze the reaction. The reaction is usually carried out in an apparatus equipped with a water trap so that water is removed from the reaction mixture as it is formed.

The following examples are presented to further illustrate the present invention; they should not be construed as limiting it in spirit or in scope. In these examples, quantities are indicated in parts by weight and temperatures in degrees centigrade (° C.).

Example 1

To 10 parts of xanthydrol in an apparatus equipped with a water trap, there is added 135 parts of toluene and 10 parts of glacial acetic acid. The resultant mixture is heated almost to the boiling point and then 12 parts of N - (2 - diethylaminoethyl)isonipecotamide is added. The resultant solution is refluxed for 21 hours; it is then cooled and solid potassium carbonate is added. The mixture is then filtered and solvent is evaporated from the filtrate to concentrate it to a small volume. Ether is added and the solid present is then separated by filtration and recrystallized from a mixture of benzene and hexane to give N-(2-diethylaminoethyl)-1-(9-xanthenyl)isonipecotamide melting at about 173–174°. This compound has the following formula

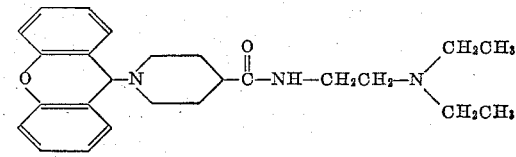

Example 2

A mixture of 10 parts of xanthydrol, 11 parts of N-(3-dimethylaminopropyl)isonipecotamide, 3 parts of glacial acetic acid, and 180 parts of toluene is refluxed for 4 hours in an apparatus equipped with a water trap. The solvent is then evaporated from the solution under reduced pressure to leave a residual solid. This solid is recrystallized from a mixture of chloroform and ether to give N-(3-dimethylaminopropyl) - 1 - (9-xanthenyl)isonipecotamide melting at about 206–208° C.

Example 3

The procedure of Example 2 is repeated using an equivalent quantity of N-(2-piperidinoethyl)isonipecotamide in place of the N-(3-dimethylaminopropyl)isonipecotamide. The product obtained in this way is N-(2-piperidinoethyl) - 1 - (9-xanthenyl)isonipecotamide meltisg at about 202–203° C.

Example 4

Xanthydrol is reacted with N-[2-(3-azabicyclo[3.2.2]non-3-yl)ethyl]isonipecotamide according to the procedure described in Example 2. The product obtained from this reaction is N-[2-(3-azabicyclo[3.2.2]non-3-yl)ethyl]-1-(9-xanthenyl)isonipecotamide melting at about 188–189° C. This compound has the following formula

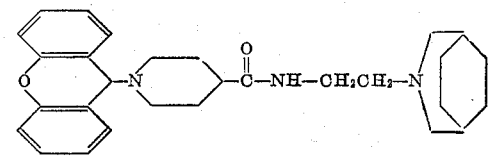

The necessary intermediate for this reaction is prepared by the following procedure. A slurry of 55 parts of isonicotinoyl chloride hydrochloride in 200 parts of pyridine is added portionwise to a solution of 40 parts of 3-(2-aminoethyl)-3-azabicyclo[3.2.2]nonane in 200 parts of pyridine at 40–45° C. The reaction is exothermic so that external cooling is necessary from time to time to maintain the indicated temperature. After all the acid chloride has been added, the resultant mixture is heated at 55–60° for one hour. The solvent is then evaporated under reduced pressure and a mixture of chloroform and dilute aqueous sodium hydroxide solution is added to the residue. The chloroform layer is then separated, washed with water, dried, and treated with charcoal. The solvent is then evaporated under reduced pressure to leave a residual oil which solidifies on standing. Hexane is then added and the solid is separated by filtration. It is then recryallized from a mixture of benzene and hexane to give N-[2-(3-azabicyclo[3.2.2]-non-3-yl)ethyl]isonicotinamide melting at about 111–112° C. This compound has been found to possess convulsant properties similar to strychnine.

A solution of 43 parts of N-[2-(3-azabicyclo[3.2.2]-non-3-yl)ethyl]isonicotinamide in 120 parts of ethanol is hydrogenated using 4.0 parts of 5% ruthenium on charcoal catalyst and a hydrogen pressure of about 1000 pounds per square inch. The hydrogenation is carried out at 103° C. for 11 hours. The mixture is then cooled and filtered to remove the catalyst. The solvent is evaporated from the filtrate under reduced pressure to leave a residual oil which solidifies on standing. This solid is then recrystallized from a mixture of benzene and hexane to give N-[2-(3-azabicyclo[3.2.2]non-3-yl)ethyl]isonipecotamide melting at about 117–119° C. This compound and the corresponding pyridine compound described in the preceding paragraph possess hypotensive activity and also antimicrobic activity against a variety of organisms.

*Example 5*

Other compounds which may be prepared by the procedure of Example 2 by selecting the appropriate starting materials are, for example, N-(2-diethylaminoethyl)-1-(9-thioxanthenyl)isonipecotamide N-(2-diethylaminoethyl)-1-(2-chloro-9-xanthenyl)isopecotamide N-(2-diethylaminoethyl)-1-(9-xantheyl)nipecotamide N-[3-(1-pyrrolidinyl)ethyl]-1-(9-xanthenyl)isonipecotamide N-(2-morpholinoethyl)-1-(9-xantheyl)isonipecotamide N-[2-(4-methyl-1-piperazinyl)ethyl]-1-(9-xantheyl)isonipecotamide N-[2-(3-azabicyclo[3.3.0]oct-3-yl)ethyl]-1-(9-xanthenyl)isonipecotamide N-[2-(7-azabicyclo[4.3.0]non-7-yl)ethyl]-1-(9-xanthenyl)isonipecotamide N-[2-(3-azabicyclo[4.4.0]dec-3-yl)-ethyl]-1-(9-xanthenyl)isonipecotamide Intermediates needed for the preparation of these compounds can be obtained by the procedure described in the last two paragraphs of Example 4.

What is claimed is:
1. A compound of the formula

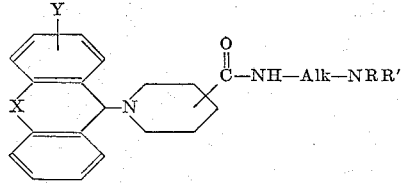

wherein X is selected from the group consisting of O and S; Y is selected from the group consisting of hydrogen and chlorine; Alk is lower alkylene separating the nitrogens attached thereto by at least 2 carbon atoms; —NRR' is selected from the group consisting of di(lower alkyl)amino, 1-pyrrolidinyl, piperidino, morpholino, 1-methyl-4-piperizinyl and azabicycloalkyl containing from 7 to 9 carbon atoms.

2. A compound according to claim 1 which has the formula

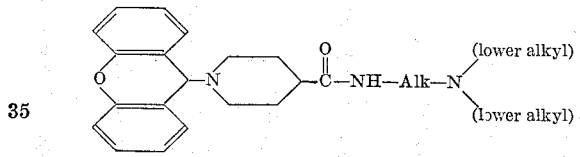

wherein Alk is lower alkylene separating the nitrogen attached thereto by at least 2 carbon atoms.

3. A compound according to claim 1 which is N-(2-diethylaminoethyl)-1-(9-xanthenyl)isonipecotamide.

4. A compound according to claim 1 which is N-(3-dimethylaminopropyl)-1-(9-xanthenyl)isonipecotamide.

5. A compound according to claim 1 which is N-(2-piperidinoethyl)-1-(9-xantheyl)isonipecotamide.

6. A compound according to claim 1 which is N-[2-(3 - azabicyclo[3.2.2]non - 3 - yl)ethyl] - 1 - (9 - xanthenyl)isonipecotamide.

No references cited.

WALTER A. MODANCE, *Primary Examiner.*

AVROM D. SPEVACK, *Assistant Examiner.*

UNITED STATES PATENT OFFICE
CERTIFICATE OF CORRECTION

Patent No. 3,318,901                      May 9, 1967

John W. Cusic et al.

It is hereby certified that error appears in the above numbered patent requiring correction and that the said Letters Patent should read as corrected below.

Column 1, line 58, for "asorbic" read -- ascorbic --; column 2, line 55, for "meltisg" read -- melting --; column 3, line 45, for "iso-" read -- isoni- --; line 50, for "(2-morpolinoethyl)-" read -- (2-morpholinoethyl)- --.

Signed and sealed this 9th day of January 1968.

(SEAL)
Attest:

Edward M. Fletcher, Jr.                      EDWARD J. BRENNER
Attesting Officer                           Commissioner of Patents